United States Patent
Eichenberger et al.

(10) Patent No.: US 8,490,071 B2
(45) Date of Patent: Jul. 16, 2013

(54) SHARED PREFETCHING TO REDUCE EXECUTION SKEW IN MULTI-THREADED SYSTEMS

(75) Inventors: Alexandre E. Eichenberger, Chappaqua, NY (US); John A. Gunnels, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 12/773,454

(22) Filed: May 4, 2010

(65) Prior Publication Data

US 2011/0276786 A1 Nov. 10, 2011

(51) Int. Cl.
*G06F 9/45* (2006.01)
(52) U.S. Cl.
USPC .......................................... 717/151; 712/207
(58) Field of Classification Search
None
See application file for complete search history.

(56) References Cited

U.S. PATENT DOCUMENTS

| | | | |
|---|---|---|---|
| 2003/0005419 A1* | 1/2003 | Pieper et al. | 717/141 |
| 2003/0225996 A1* | 12/2003 | Thompson | 712/207 |
| 2005/0071572 A1* | 3/2005 | Nakashima et al. | 711/137 |
| 2006/0070040 A1* | 3/2006 | Chilimbi et al. | 717/130 |
| 2011/0153987 A1* | 6/2011 | Luke et al. | 712/207 |

* cited by examiner

*Primary Examiner* — Elias Mamo
(74) *Attorney, Agent, or Firm* — Stephen J. Walder, Jr.; Daniel P. Morris

(57) ABSTRACT

Mechanisms are provided for optimizing code to perform prefetching of data into a shared memory of a computing device that is shared by a plurality of threads that execute on the computing device. A memory stream of a portion of code that is shared by the plurality of threads is identified. A set of prefetch instructions is distributed across the plurality of threads. Prefetch instructions are inserted into the instruction sequences of the plurality of threads such that each instruction sequence has a separate sub-portion of the set of prefetch instructions, thereby generating optimized code. Executable code is generated based on the optimized code and stored in a storage device. The executable code, when executed, performs the prefetches associated with the distributed set of prefetch instructions in a shared manner across the plurality of threads.

21 Claims, 5 Drawing Sheets

US 8,490,071 B2

SHARED PREFETCHING TO REDUCE EXECUTION SKEW IN MULTI-THREADED SYSTEMS

This invention was made with United States Government support under Contract No. B554331 awarded by the Department of Energy. The Government has certain rights in this invention.

BACKGROUND

The present application relates generally to an improved data processing apparatus and method and more specifically to mechanisms for shared prefetching to reduce execution skew in multi-threaded systems.

Today, data processing system architecture is primarily moving to the multi-processor architectures in which multiple processors or cores, either one the same or different integrated circuit chips, are provided in data processing system to provide additional computational power. Subsets of processors/cores typically share some portion of memory, e.g., system memory, and thus, can all read and write to this shared memory. In some architectures, the processor/cores may further have their own local memories as well, such as in the Cell Broadband Engine (CBE) processor available from International Business Machines Corporation of Armonk, N.Y.

Managing memory bandwidth on shared memory multi-processor data processing systems is an extremely important task. Memory bandwidth is the rate at which data can be read from or written to memory by a processor or from one memory to another, e.g., from system memory to cache or vice versa. Memory bandwidth, e.g., between caches and/or memory subsystems, is often a very critical resource. Moreover, as a data processing system becomes larger, e.g., through addition of hardware resources having additional processing capabilities, balancing the load between threads executing in the various processors of the data processing system becomes increasingly more important.

SUMMARY

In one illustrative embodiment, a method, in a data processing system, is provided for optimizing code to perform prefetching of data into a shared memory of a computing device that is shared by a plurality of threads that execute on the computing device. The method comprises identifying, by a compiler executing on at least one processor of the data processing system, a memory stream, of a portion of code, that is shared by the plurality of threads, each thread in the plurality of threads having an associated instruction sequence. The method further comprises distributing, by the compiler, a set of prefetch instructions across the plurality of threads. Moreover, the method comprises inserting, by the compiler, prefetch instructions, of the set of prefetch instructions, into the instruction sequences of the plurality of threads such that each instruction sequence has a separate sub-portion of the set of prefetch instructions, thereby generating optimized code. Furthermore, the method comprises generating executable code based on the optimized code and storing the executable code in a storage device of the data processing system. The executable code, when executed, performs the prefetches associated with the distributed set of prefetch instructions in a shared manner across the plurality of threads.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
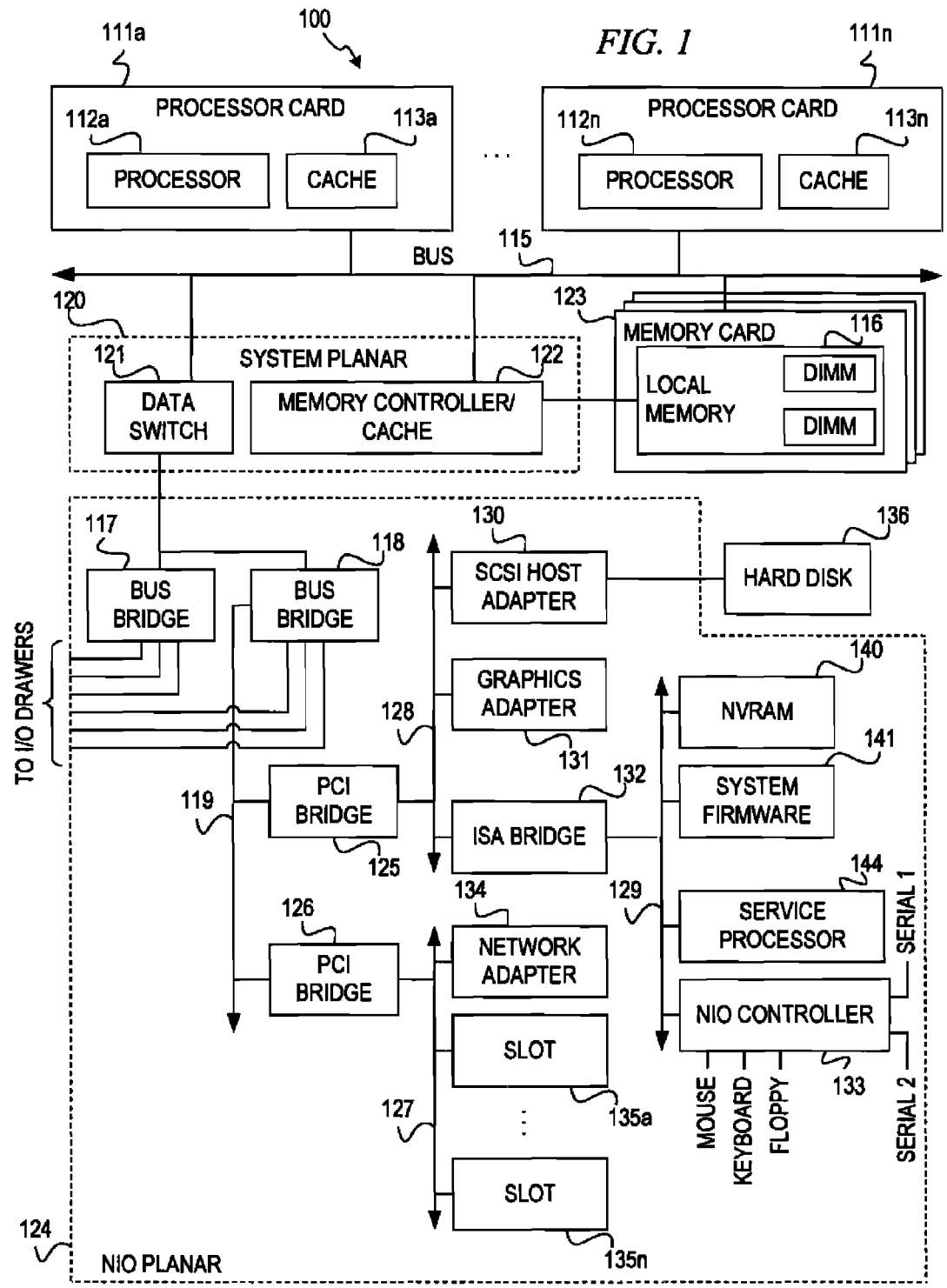
FIG. 1 is an example block diagram of a data processing system with which aspects of the illustrative embodiments may be utilized.

The illustrative embodiments provide a mechanism for shared prefetching to reduce execution skew in multi-threaded systems. It has been determined that when multiple threads of execution, i.e. a sequence of instructions that may be executed in parallel with other sequences of instructions (other threads), share some data in common and share a portion of a cache hierarchy (e.g., a chain of level 1 cache, level 2 cache, and system memory), often the same data is moved several times along the cache hierarchy. This is especially true when there is data prefetching used to reduce the latency of memory operations. Data prefetching is a technique whereby data is fetched from system memory into a cache (which is closer to the processor than system memory) before the data is actually needed by the instructions of the thread being processed by the processor. The redundant moving of the same data leads to wasted memory bandwidth since the same data is taking up more the memory bandwidth with each movement of the data.

In cases where prefetching is not used, often one thread must execute at a slower rate than another as it waits for loads of data from system memory into cache. In cases where prefetching is used to reduce latency introduces execution skew amongst the threads is often introduced where one thread completes earlier than another thread that accesses the same data. Because of this execution skew, data that is accessed by both threads may have to be reloaded into the cache from system memory if it is evicted from the cache before the later completing thread uses the data. As a result, additional fetching of the same data from system memory is required and memory bandwidth is wasted.

The mechanisms of the illustrative embodiments operate to interleave prefetches of data of a single memory stream among two or more threads that access this memory stream so as to reduce the execution skew among such threads. By interleaving the prefetches, in addition to the reduction in execution skew among the threads, resource pressures on the memory subsystem, which includes the cache hierarchy, is reduced. By reducing the execution skew, there is improved exploitation of the locality of the data, i.e. the data being stored locally in the cache rather than having to be fetched from system memory, which leads to less wasted bandwidth and less load imbalance due to latencies in the memory subsystem, i.e. less idle time at memory barriers (barrier instructions used to synchronize memory accesses). As a result, the instructions of the threads will be executed more quickly in the multiprocessor system.

As a further benefit, the mechanisms of the illustrative embodiments improve resiliency testing of the processors and data processing system as a whole. That is, by allowing the instructions of the threads to execute more quickly, the processors and the data processing system are subjected to improved stress tests. Stress tests are important for the manufacturer of computers, as the manufacturer often has to run tests that challenge aspects of the architecture as much as possible. Passing such stress tests are important so as to reassure the clients that the machines that they are considering buying can withstand the harshest possible computational tasks that one might throw at the computer. One such stress test attempts to exercise the memory subsystem as much as possible. Without the illustrative embodiments, it may be hard to exercise a given memory level as much as possible if wasted bandwidth occurring at a higher level of the cache hierarchy prevents the stress test to be applied to the given lower level of the memory hierarchy. Being able to limit wastage of memory bandwidth (as proposed herein) will allow one to write stress tests that can precisely focus on the desired level of the memory hierarchy without negative interference from the other levels of the memory hierarchy.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings, and in particular to FIG. 1, there is depicted an example block diagram of a data processing system with which aspects of the illustrative embodiments may be utilized. As shown, data processing system 100 includes processor cards 111*a*-111*n*. Each of processor cards 111*a*-111*n* includes at least one processor and at least one cache memory. For example, processor card 111*a* contains processor 112*a* and cache memory 113*a*, and processor card 111*n* contains processor 112*n* and cache memory 113*n*. It should be appreciated that while only a single processor is shown for each processor card, each processor card may comprise a plurality of processors with some of these processors having either their own separate cache or being able to share the same cache amongst more than one of the processors. It should also be noted that each processor (or core) on the processor card may execute a single thread of execution, i.e. a sequence of instructions, or may be capable of executing multiple threads of execution, such as in a multithreaded processor architecture. The case of processors (or cores) that individually can execute more than one thread at a time, the threads may share the same memory hierarchy, including a cache. Between processors, however, only those levels of the memory hierarchy that are common between the processors are shared, which may include a shared cache, main memory, and/or the like.

Processor cards 111*a*-111*n* are connected to main bus 115. Main bus 115 supports a system planar 120 that contains processor cards 111*a*-111*n* and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135*a*-135*n* via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software. FIG. 1 is only provided as an example of one type of data processing system in which the illustrative embodiments may be implemented. The illustrative embodiments are not limited to any particular data processing system architecture. To the contrary, the illustrative embodiments may be implemented in any shared memory multithreaded data processing system without limit to any particular architecture or configuration. The multi-threaded data processing system may be a single processor system or multi-processor system as long as the data processing system supports multiple threads that may be executed concurrently using a shared memory. For example, in a single processor or core architecture, multiple threads may execute on the single processor/core with the threads typically sharing nearly all resources, e.g., functional units, physical registers, cache hierarchy, etc. In a multi-processor/core architecture, threads running on distinct processors/cores do not share all resources. Typically, the threads access a distinct pool of functional units, physical registers, L1-cache, etc., but may share a common L2-cache or L3-cache, depending upon the topography of the cores and their associated cache hierarchy. Typically, all threads on a core may share memory via a shared memory system. The same can be said for all threads on multiple cores in a chip.

A processor/core is typically comprises of a set of registers, functional units, instruction decode/dispatch units, and the like, as is generally known in the art, which is replicated so as to create a multi-processor architecture for supporting many threads of execution. Typically, numbers of threads per processor/core are 2, 4, or even 8 threads per processor/core. Typical numbers of cores per chip may be 2, 4, or even 8 cores per chip, where a chip may be akin to element 111a in FIG. 1. Multiple chips may be assembled to build a node, e.g., the entire system shown in FIG. 1. A supercomputer may be comprised of many, possibly thousands or more, nodes connected by a network.

As mentioned above, the mechanisms of the illustrative embodiments provide an ability to interleave prefetch instructions in the instruction streams of two or more threads for prefetching data/instructions in a memory stream accessed by the two or more threads. This interleaving of prefetches essentially distributes the work of the prefetching over the plurality of threads and reduces the execution skew of among the threads, leading to a greater exploitation of the locality of data in the cache, while achieving the performance benefit of prefetching. In one illustrative embodiment, the interleaving of prefetch instructions into the instruction streams of the various threads is accomplished by a compiler when compiling the code that is to execute by a plurality of threads on a plurality of processors/cores. This interleaving of prefetch instructions may be considered one of the optimizations performed by the compiler when it takes original source code and optimizes it for parallel execution by multiple threads. The compiler may make use of static analysis of the code performed by the compiler to determine where to introduce this optimization. In addition, or alternatively, the compiler may make use of dynamic analysis performed by hardware during execution of a less optimized version of the code to determine where to introduce this optimization so as to generate a more optimized version of the code.

For purposes of this description, it will be assumed that the prefetching is for prefetching of data from system memory into a shared data cache local to the processors/cores upon which the threads are executing. However, it should be appreciated that the same mechanisms and associated benefits apply to the prefetching of instructions from system memory into an instruction cache as well and the present invention may be implemented with regard to instructions and instruction caches as well.

Figure 2:
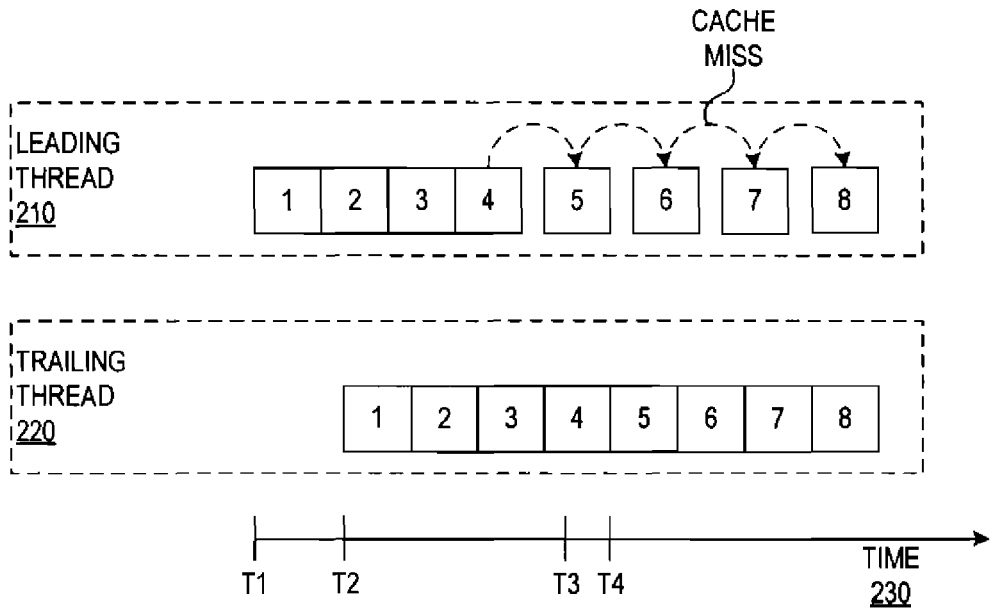
FIG. 2 is an example diagram illustrating the way in which a shared memory multithreaded data processing system handles two threads accessing the same memory stream without prefetching.

To better understand the operation of the mechanisms of the illustrative embodiments, it is beneficial to understand the problems associated with traditional ways in which memory accesses by threads are handled in shared memory multi-threaded data processing systems. FIG. 2 is an example diagram illustrating the way in which a shared memory multi-threaded data processing system handles two threads accessing the same memory stream without prefetching. In the context of the present description, a memory stream is a logical sequence of memory addresses touched, i.e. accessed, by a thread. For example, a[0], a[1], a[2], etc., is a memory stream having a stride of 1, i.e. each of the array elements is only 1 away from the previous array element accessed. As another example, a[0], a[2], a[4], etc. is a memory stream having a stride of 2. Even a[b[0]], a[b[1]], a[b[2]], etc., can be considered a memory stream where b[ ] is a memory stream of stride 1 and a[ ] has no fixed stride known at compile time (unless the actual values of the b[ ] array are known at compile time). Nevertheless, this is a logical sequence of memory addresses in that the accessed to memory access the array a[ ].

With reference now to FIG. 2, two threads 210 and 220 are shown in which thread 210 is a leading thread and thread 220 is a trailing thread. The leading thread 210 is considered to be leading because, with reference to the time axis 230, this thread begins execution prior to the trailing thread 220. It should be noted that this is only one reason for thread 210 to be leading; other reasons may include, but are not limited to, thread 210 having a bit less work than thread 220, thread 220 having a bit more work than thread 210, having thread 220 execute in a core in which there is more contentions for resources than thread 210, having thread 220 execute in a core where there are more operating system interferences than thread 220, and the like. Each thread 210 and 220 may be executing on a separate core within the same processor card, chip, or the like, or on different processor cards, chips, or the like. For purposes of this example, it is assumed that both threads 210 and 220 are executing the same sequence of instructions, however it should be appreciated that the benefits of the mechanisms of the illustrative embodiments are not limited to situations in which multiple threads are all executing the same sequence of instructions. Boxes in the depiction of FIG. 2 represent the usage of data corresponding to a memory address specified in the box at the particular time point on the time axis 230 at which the box is located.

Each thread 210 and 220 accesses the same memory stream, e.g., memory addresses 1, 2, 3, 4, ..., 8, as shown in the depicted example. As shown, the leading thread 210 accesses memory addresses 1, 2, 3, and 4 and then experiences a delay or lag in execution as it waits for the data corresponding to memory address 5 to be loaded into the cache for use by the thread 210. That is, when the data is not present in the cache, a cache miss occurs and the data must be retrieved from the system memory and loaded into the cache. Typically, this involves evicting a cache line in the cache and then loading a new cache line that stores the needed data corresponding to the memory address, along with other data. This process slows down the execution of thread 210 as the cache miss handling requires additional operations to be performed before the thread 210 can proceed with its computations and operations associated with its sequence of instructions.

The delay experienced due to this cache miss is shown in FIG. 2 as an arching arrow and space between memory addresses 4 and 5. Similar delays are experienced with the subsequent memory addresses 5, 6, 7, and 8, as a cache miss occurs with each of these memory addresses. Thus, the execution time for thread 210 is extended by the cumulative amount of time needed to handle the cache misses as represented by the spaces and arching arrows.

Meanwhile, the trailing thread 220 begins its execution at a time t2 later than the initial execution time t1 of the leading thread 210. Because the trailing thread 220 is executing in a delayed manner, its memory address accesses in the memory stream, comprising memory addresses 1 to 8 in this example, occur after the loading of the data into the cache performed as a result of the cache misses experienced by the leading thread 210. That is, the access of memory address 5 in thread 220 occurs at a later time t4 from the time t3 at which the data for memory address 5 is loaded into the cache by the handling of the cache miss that occurred during the execution of thread 210. Similarly, the other memory accesses for memory address 6-8 likewise occur after or at substantially the same time as the same memory accesses occur in the execution of the leading thread 210. Thus, the execution of thread 220 benefits from the loading of cache lines due to cache misses in the execution of thread 210 such that the execution of thread 220 catches up with the execution of thread 210, i.e. the memory access of memory address 8 in the thread 220 occurs at substantially the same time as the memory access of memory address 8 in the execution of thread 210. As a result, there is an implicit reduction in the execution skew between threads 210 and 220, however the execution of thread 210 is less than optimal due to the delays incurred because of cache misses.

Figure 3:
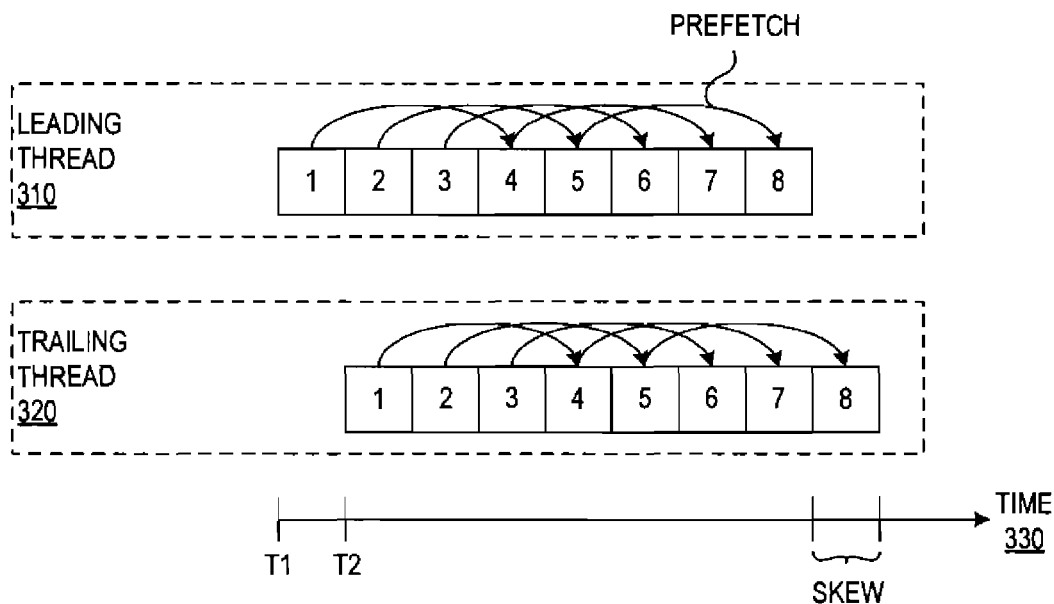
FIG. 3 is an example diagram illustrating the way in which a shared memory multithreaded data processing system handles two threads accessing the same memory stream with prefetching being performed by each thread for the entire memory stream accessed by that thread.

FIG. 3 is an example diagram illustrating the way in which a shared memory multithreaded data processing system handles two threads accessing the same memory stream with prefetching being performed by each thread for the entire memory stream accessed by that thread. One form of prefetching involves inserting instructions into the instruction stream of a thread to cause data that is to be used in computations at a later time to be loaded into the cache prior in time to the time at which the data will be needed to perform the computations. Moreover, prefetching can be performed by hardware mechanisms in a similar manner. Hybrid approaches may also be used where software indicates to the hardware which memory stream to prefetch and leaves it to the hardware to issue the prefetch for the memory stream. Any of the software, hardware, or hybrid prefetch mechanisms may be used with the illustrative embodiments without departing from the spirit and scope of the illustrative embodiments.

As shown in FIG. 3, two threads 310 and 320 are shown in which thread 310 is a leading thread and thread 320 is a trailing thread. Again, each thread 310 and 320 may be executing on a separate core within the same processor card, chip, or the like, or on different processor cards, chips, or the like. Also, as in the example of FIG. 2 above, for purposes of this example, it is assumed that both threads 310 and 320 are executing the same sequence of instructions. Boxes in the depiction of FIG. 3 represent the usage of data corresponding to a memory address specified in the box at the particular time point on the time axis 330 at which the box is located.

Each thread 310 and 320 accesses the same memory stream, e.g., memory addresses 1, 2, 3, 4, ..., 8, as shown in the depicted example. As shown, the leading thread 310 accesses memory address 1 but at the same time initiates a prefetch of the data from memory address 4 (as represented by the arching arrow from memory address 1 to memory address 4). Similarly, when the leading thread 310 accesses memory address 2, a prefetch of the data for memory address 5 is initiated, and so on. As a result, by the time the data from memory addresses 4-8 are needed for computations or other operations performed by the thread 310, the data has been prefetched and is already present in the cache. Therefore, thread 310 does not experience any delays due to cache misses and cache miss handling. However, it should be appreciated that thread 310 includes prefetch instructions for all of the data that thread 310 uses.

Meanwhile, the trailing thread 320 begins its execution at a time t2 later than the initial execution time t1 of the leading thread 310. Similar to the example in FIG. 2 above, because the trailing thread 320 is executing in a delayed manner, its memory address accesses in the memory stream, comprising memory addresses 1 to 8 in this example, occur after the loading of the data into the cache performed as a result of the cache misses experienced by the leading thread 310. The instruction stream of thread 320 also includes prefetch instructions such that the data for memory access 4 is prefetched when the data for memory address 1 is being utilized by the thread to perform computations or other operations, the data for memory address 5 is prefetched when memory address 2 is being utilized by the thread 320, etc. It should be appreciated that the prefetching performed by thread 320 may obtain the benefit of the prefetching performed by thread 310, but the trailing thread 320 cannot assume that the data will be prefetched by a leading thread 310 into the cache in sufficient time for the data to be present when the trailing thread 320 needs the data, or that the data is still in the cache, following the prefetch by the leading thread 310, when the trailing thread 320 needs the data. Moreover, it may not be determined at compile time which thread will be the leading thread and which will be the trailing thread and thus, each thread cannot simply assume that it will be able to make use of prefetched data from a leading thread. As a result, a safe approach is used where both threads perform prefetching of their own data with the overhead of the trailing thread 320 possibly being slightly reduced by the fact that some of the data may already be in the cache. Whether trailing thread 320 is able to take advantage of the prefetching performed by the leading thread 310 or not, the data that is required by thread 320 is brought into the cache prior to it being needed for computations or other operations performed by thread 320. Thus, the execution of thread 320 is already optimized with regard to the data being present in the cache.

Since both thread 310 and 320 are optimized such that they perform their own prefetching, the trailing thread 320 execution cannot be optimized such that it executes faster, i.e. the trailing thread 320 cannot catch up with the execution of the leading thread 310. This is because there are no cache misses (and it is assumed here that there are no other sources of delay known at compile time that can be accounted for by compiler optimizations). As a result, the execution skew between the threads 310 and 320 remains unchanged or may increase in cases where cache misses or other delays in the execution of trailing thread 320 may occur, i.e. thread 320 still executes at a minimum skew of t2−t1.

Because the skew remains the same or increases, it is not safe for the trailing thread 320 to assume that data will be present in the cache prior to it needing the data for computations/operations and thus, the trailing thread 320 repeats the prefetching performed by the leading thread 310. That is, each of the prefetches performed by the trailing thread 320 are redundant with regard to the prefetches performed by the leading thread 310. These prefetch operations use important resources, e.g., memory bandwidth, processor cycles, etc. Thus, when there are redundant prefetch operations performed, memory bandwidth and the other resources required to perform the prefetch operation are wasted, e.g., in the depicted example, the memory bandwidth used to perform the prefetches between system memory and the cache is twice (2×) the memory bandwidth that would otherwise be necessary to bring the required data into the cache. Even if the prefetches for the trailing thread were removed, there is still a opportunity for wasted bandwidth, as a memory access performed by the trailing thread may need to reinstall its data in the cache when such data has been evicted between the last access by the leading thread 310 and the first subsequent access by the trailing thread 320. The best way to lower the risk of such wasted bandwidth is to facilitate execution of common memory access that occur between threads 310 and 320 at substantially the same time.

Furthermore, since the trailing thread 320 cannot catch up to the leading thread 310, load imbalance is not mitigated. Load imbalance has a direct impact on the performance of the threaded parallel application as, typically, the application will at some later time synchronize two or more threads. For example, assume that threads 310 and 320 participate in computing a chunk of work that has been parallelized between these two threads. The consumer of this work will have to wait for the trailing thread in order to be able to safely consume all of the work produced by threads 310 and 320. In other words, parallel threads often have to be synchronized, typically by a synchronization barrier that ensure that all of the threads participating into a parallel chunk of work have all finished, before the result of this chunk of work can be used. Whenever the application waits for all of the threads to finish, this implies that the application will wait for the slowest of all of the threads. Thus, the dominant factor in such parallel work is how fast can the slowest thread complete. Load imbalance is a measure of the amount by which the slowest thread has more work than all of the others.

What has been seen in FIG. 3 is that the trailing thread 320 has not had an opportunity to catch up with the leading thread 310. Contrast this, for example to the outcome in FIG. 2, where thread 210 experienced some stall in order to install the data that it needs in the cache and thread 220 needed in the cache. In this example, the load imbalance (inherent here by the fact that thread 220 is shown to start later) is being mitigated as thread 210 has more work (to install the data 4, 5, 7, and 8) whereas thread 220 has less work (since all of its data has been installed by thread 210).

In addition, because the leading thread 310 in FIG. 3 is not slowed down, it competes with the trailing thread 320 with equal weighting for the shared resources, e.g., load/store/compute entry queues, instruction fetch/dispatch unit queues, and the like. This observation assumes that both threads 310 and 320 execute on the same processor or core, but by extension it applies also to a set of processors/cores with two or more threads executing in each of the processors/cores. Ideally, the leading thread 310 should be slowed down so that more of these resources can be allocated to the trailing thread 320. In this context, a thread is being slowed down by the virtue that if it executes a load instruction for which the data is not present, then the thread will stall at some later time (either instantly in an in-order processor, or at some later time in an out-of-order processor). Once the thread has stalled, no more new instructions can be fetched, issued, and inserted on execution queues. Typically, there is a maximum number of instructions per thread that can be in-flight. Because no more new instructions are issued for the stalled thread, this frees up resources to the other non-stalled threads within the same core. As a result, these other threads may get a higher fraction of the overall compute resources for their own execution. This will allow these other threads to make comparatively faster progress than if the stalled thread was still active and not blocked.

Thus, as shown in FIG. 2 above, not performing any prefetches results in an implicit reduction in execution skew of the threads 210 and 220, but the overall execution of the threads is slow due to having to handle cache misses. As shown in FIG. 3, prefetching improves the speed by which the threads 310 and 320 execute, but there is no reduction in the execution skew and, due to the redundant prefetches, this solution suffers from the drawbacks mentioned above. A third possible solution is to institute active coordination mechanisms between the threads, such as locks, barrier instructions, or the like. However, these mechanisms introduce additional overhead which becomes too expensive, in terms of processor cycles and other resources, such that the execution of the threads is actually slowed rather than made faster.

There is no mechanism in known systems to assist threads in accessing the same data at approximately the same time. The illustrative embodiments described herein, however, provide a mechanism for interleaving prefetches such that the prefetching is shared amongst the various threads accessing the same portion of a memory stream. This allows the threads to access the same data at approximately the same time and thereby reduces the number of prefetches necessary to ensure that the required data is present in the cache. This in turn reduces the amount of wasted memory bandwidth, the load imbalance due to the memory subsystem, and basically allows the code being executed by the threads to execute faster.

Figure 4:
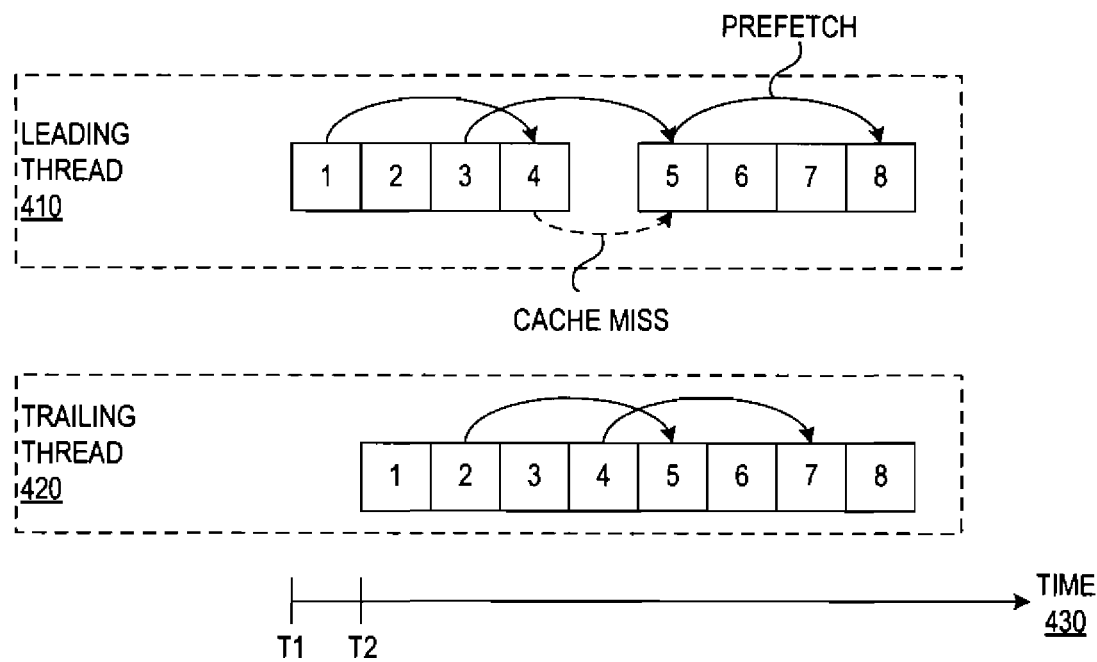
FIG. 4 is an example diagram illustrating one way in which a shared memory multithreaded data processing system handles two threads accessing the same memory stream with interleaved prefetching in accordance with one illustrative embodiment.

FIG. 4 is an example diagram illustrating one way in which a shared memory multithreaded data processing system handles two threads accessing the same memory stream with interleaved prefetching in accordance with one illustrative embodiment. As with the examples set forth in FIGS. 2 and 3 above, there are two threads 410 and 420 that are executing in parallel with thread 410 being the leading thread and thread 420 being the trailing thread. It should be appreciated that, for purposes of simplicity of the illustration, only two threads 410 and 420 are being shown but the mechanisms of the illustrative embodiments are not limited to only two threads executing in parallel. To the contrary, the mechanisms of the illustrative embodiments apply to any number of threads executing in parallel, i.e. any plurality of threads executing in parallel.

A key difference between the execution of the threads 410 and 420 shown in FIG. 4 from the threads 210 and 220 in FIG. 2 is that the threads 410 and 420 make use of prefetching similar to the prefetching shown in FIG. 3. However, a key difference between the execution of the threads 410 and 420 shown in FIG. 4 from the threads 310 and 320 in FIG. 3 is that the prefetching performed by each thread 410 and 420 does not involve prefetching the data corresponding to all of the memory accesses in the common portion of a memory stream shared by the two threads, but instead involves each thread performing prefetching of data for a sub-portion of the memory accesses in the common portion of the memory stream that is common to both threads 410 and 420. These sub-portions of the memory accesses together constitute all of the memory accesses for the common portion of the memory stream. Thus, these sub-portions of the memory accesses facilitate the sharing of prefetch operations amongst the threads accessing a common portion of a memory stream. For example, in the example depicted in FIG. 4, the leading thread 410 performs prefetches for memory addresses 4, 6, and 8 while the trailing thread 420 performs prefetches for the memory addresses 5 and 7.

As shown in FIG. 4, prefetches for data associated with memory addresses 4-8 are shared amongst threads 410 and 420 and, in this particular example, are interleaved. When the leading thread 410 accesses memory address 1, a prefetch for memory address 4 is initiated. Thereafter, the trailing thread 420 begins execution and, when the trailing thread 420 accesses the memory address 2, a prefetch of the data for memory access 5 is initiated. The next prefetch is performed when the leading thread 410 accesses memory address 3 and it prefetches the data from memory address 6. Similarly, the next prefetch for the common memory sequence is performed by the trailing thread 420 when the trailing thread 420 accesses memory address 4 and the prefetch for data corresponding to memory address 8 is performed when the leading thread 410 accesses the memory address 5.

While the trailing thread 420 prefetches the data for memory address 5 when it accesses the data for memory address 2, the prefetch is issued too late for the data to be loaded into the cache such that the leading thread 410 can access the data in the cache. This will slow down the leading thread 410 as it waits for handling of the cache miss (represented by the space between elements 4 and 5 in the leading thread 410. Thus, the leading thread 410 prefetches data for memory addresses 4, 6, and 8 but, as shown in FIG. 4, stalls when the leading thread attempts to access the data for memory address 5 which has not been loaded into the cache yet. The trailing thread 420 prefetches the data for memory addresses 5 and 7 and does not stall since the interleaved prefetches actually prefetch the data needed by the trailing thread 420 such that the data is present in the cache before the data is needed for computations/operations performed by the trailing thread 420. Furthermore, the delay introduced into the leading thread 410 by the handling of the cache miss essentially slows the leading thread 410 such that the trailing thread 420 catches up with the leading thread 410, thereby implicitly reducing the execution skew between the two thread 410 and 420. By interleaving the prefetches in this manner and sharing the prefetches amongst the threads 410 and 420, the drawbacks of execution skew between the threads is reduced while obtaining the benefit of increased performance, e.g., faster execution of the threads when compared to not performing prefetching.

It is important to realize that the use of prefetching operations is only one form of prefetching. In another embodiment, one can insert load instructions for which the result is not used for a large number of cycles. For example, in this illustrative embodiment, thread 410 may issue a load of data 4 prior to using the data 1, but will make sure that the results of the load of data 4 are not used until the time where data 4 is used under the prior illustrative embodiments described above. In another embodiment, the compiler does not insert prefetch instructions or load operations, but instead inserts an instruction that indicates to the hardware what to prefetch. This illustrative embodiment is indicative of a prefetching scheme where the hardware does the issuing of the prefetch instructions, under the guidance of the software, which indicates to the hardware which memory stream to prefetch. In this illustrative embodiment, the compiler inserts instructions for the hardware indicating to prefetch the memory streams for both threads 410 and 420, but starting at different starting points (data 4 and 5 for, respectively, threads 410 and 420) and a stride of 2 elements.

Figure 5:
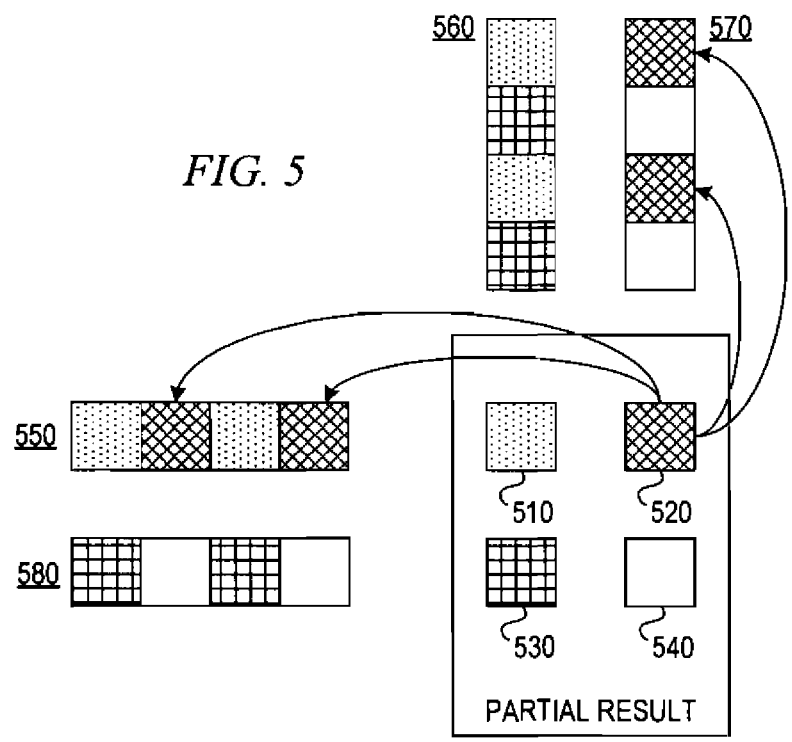
FIG. 5 is an example diagram illustrating how the interleaved prefetching mechanisms of the illustrative embodiments may be used to perform matrix multiplication using more than two threads.

The interleaved prefetching can be used to improve many different computations/operations performed by code using multiple threads executing in parallel. One such computation that is improved dramatically by the mechanisms of the illustrative embodiments is matrix multiplication, e.g., C=A*B. FIG. 5 is an example diagram illustrating how the interleaved prefetching mechanisms of the illustrative embodiments may be used to perform a partial result computation of a matrix multiplication using more than two threads. In the example shown in FIG. 5, four threads are executed in parallel to perform the matrix multiplication depicted. Each thread is responsible for prefetching a sub-portion of the common memory stream for the matrix multiplication computation.

FIG. 5 shows the row data elements of matrix A and column data elements of matrix B that are being multiplied in this matrix multiplication computation. Shadings 510-540 represent the different threads that are responsible for prefetching the corresponding data elements. Thus, for example, a first thread (represented by shading 510) is responsible for prefetching the first and third data elements of a first row 550 of the matrix A and the first and third data elements of the first column 560 of matrix B. A second thread (represented by shading 520) is responsible for prefetching the second and fourth data elements of the first row 550 of matrix A and the first and third data elements of the second column 570 of matrix B. A third thread (represented by shading 530) is responsible for prefetching the first and third data elements of the second row 580 of matrix A and the second and fourth data elements of the first column 560 of matrix B. A fourth thread (represented by shading 540) is responsible for prefetching the second and fourth data elements of the second row 580 of the matrix A and the second and fourth data elements of the second column 570 of matrix B.

As a result of this interleaving of prefetches amongst the threads, each thread is implicitly self-coordinating with at least two other threads. Because of this self-coordinating, all of the threads are reducing their execution skew. That is, each thread is achieving the reduction in skew and increased performance speed such as that described above with regard to FIG. 4.

As mentioned above, the interleaving of the prefetches may be performed by a compiler performing static analysis of code and identifying areas where multiple threads may be executing in parallel and the execution of the code may benefit from the shared prefetching of the illustrative embodiments. Moreover, the compiler may make use of dynamic analysis performed by hardware during running of a less optimized version of the code.

Figure 6:
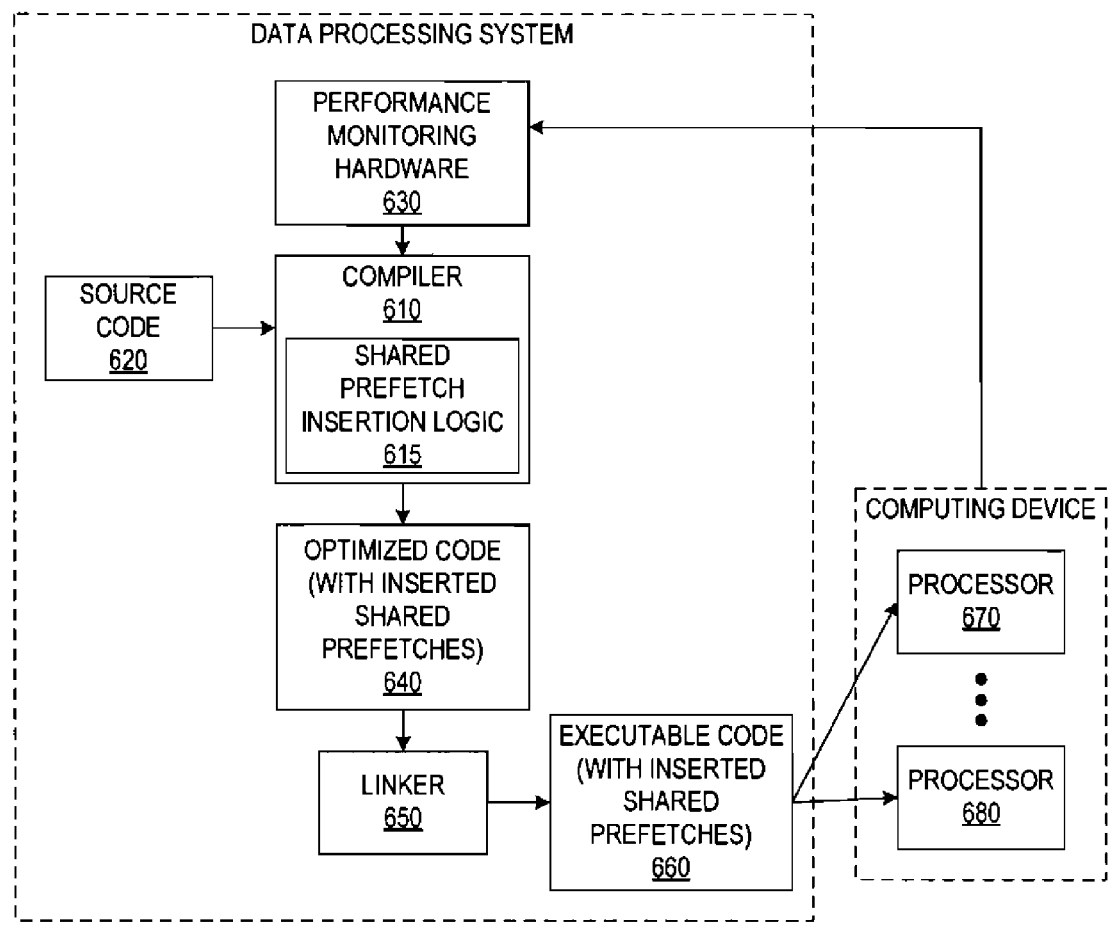
FIG. 6 is an example block diagram of a compiler mechanism for implementing the interleaved prefetching in accordance with one illustrative embodiment.

FIG. 6 is an example block diagram of a compiler mechanism for implementing the interleaved prefetching in accordance with one illustrative embodiment. As shown in FIG. 6, the compiler 610, which may be executing on one or more processors of a data processing system, receives source code 620 and optionally, hardware analysis information from performance monitoring hardware 630, such as hardware counters and/or the like, and analyzes the source code 620 to identify portions of the code 620 that can be performed in parallel, as well as other possible optimizations that may be performed on the source code. One such optimization is the interleaving of prefetches in accordance with the present invention. In particular, the shared prefetch insertion logic 615 may operate to perform various functions for analyzing code to determine if shared prefetches should be inserted into instruction sequences of threads and to actually perform the insertions when appropriate, in accordance with the illustrative embodiments described herein.

In order to perform an interleaving prefetch optimization on the source code 620, the compiler may analyze, for each memory stream accessed by two or more threads, in a portion of the code that can be executed in parallel, whether prefetching will be beneficial to the performance of the portion of code. For example, the compiler may look at loops and nested loops within the source code 620. Based on the loop structures, number of accesses to the cache performed by the portion of code, the regularity of the accesses to the cache by the portion of code, and other factors, the compiler determines whether prefetching should be performed in the portion of code.

For example, assume a given loop structure, such as the matrix multiplication kernel in the example of FIG. 5 that is typically implemented using 3 nested loops, one iterating over the partial results (510 to 540), one iterating over the rows (550, 580), and one iterating over the columns (560 and 570). The compiler may determine the loop iteration associated with each loop. For example, the outermost loop could iterate the variable i between 0 and N−1; the next loop could iterate the variable j between 0 and M−1; and the innermost loop could iterate the variable k from 0 to P−1, inclusively. Once the compiler has determined the loop statements and the iterations, the compiler may then look at each memory reference within the statement (this assumes a loop with a single statement, but this description can be extended to loops having multiple statements in a manner readily apparent to those of ordinary skill in the art in view of this description). For each memory reference, the compiler determines how the iteration variables impact the memory reference.

Consider, for example, the above example case with 3 nested loop iterating over variables i, j, and k (from the outermost loop to the innermost loop). It is assumed also that the data is laid out in a row-major format (as in the C programming language, for example). In a row major format, consecutive elements in a given row are laid out consecutively in memory. The illustrative embodiments are not limited to a row-major format and instead can be extended for languages using the column-major format, such as in programming languages Fortran and others, or other types of formats without departing from the spirit and scope of the present invention.

In row major format, a[0][1] and a[1][2] are laid out consecutively in memory because the two elements have the same row index (0) and a column index (1 and 2) that are consecutive integers. Consider a reference a[i][j]. This reference accesses consecutive data elements as the j index is increased by one, and thus the reference is declared as having a special reuse along the loop indexed by the variable j. This is true for arbitrary values of variable i. This reference does not access consecutive memory locations for consecutive values of variable i, however, as the references would refer to two distinct rows, which are not known to be consecutive in memory. As a result, the reference a[i][j] has no reuse along the loop indexed by the variable i. Because the variable k is not present in the reference a[i][j], any two distinct iterations of the loop indexing the variable k will refer to the same a[i][j] element. Thus this reference is declared as having a temporal locality along the loop indexed by the variable k.

In this way, the compiler proceeds to classify each of the memory references in a statement (or group of statements) by labeling each reference with its reuse (temporal, special, or none) for each of the loops that enclose the statement (or group of statements). In a first order of action, prefetching is deemed valuable for special reuse that occurs along the innermost loop. This is because the data is accessed one element at a time (in the memory layout) along the innermost loop. Recall that the innermost loop is the loop that is incremented after the execution of each statement in the loop body. Only when all the iterations of the innermost loop have been executed, the next outer loop variable is incremented. References with temporal locality along the innermost loop are typically not prefetched, as the same memory location will be accessed over and over along the innermost loop, thus typically experiencing at most one cache miss during the first iteration of the innermost loop. Once all the prefetching opportunities have been exploited along the innermost loop, the compiler can choose to continue exploring the prefetching of data for which special reuse has been detected along the next enclosing loop, in a similar fashion. This can continue until all loops have been explored.

The above model can also be refined by a size analysis, where the compiler keeps track of the volume of the data being accessed along each loop or set of loops, so as to model the finite size of the cache. Using this estimation of the volumes of data, the compiler can compute whether it is likely that a given referenced data in a given iteration remains in the cache for the next iteration (for a given loop enclosing the statement (or set of statements)). Note that this analysis works for arbitrary numbers of loop enclosing one or more statements, and works for memory references of arbitrary dimensions (e.g., for a, a[i], a[i][j], a[i][j][k] . . . ).

Referring again to FIG. 6, if it is determined that prefetching will be beneficial to the performance of the portion of code, the compiler may identify threads that access the shared memory stream. Based on the number of threads that access the shared memory stream, a distribution of prefetches for the shared memory stream is determined. These prefetches are then inserted into the instruction sequences of the threads such that each thread has an allotted portion of the prefetches. For example, the threads may be inserted in an interleaving round-robin pattern such that each thread accesses different portions of the system memory at approximately the same time and fetches that data into the cache. Within each instruction sequence of each thread, the prefetch instructions may be inserted into the instruction sequence every N memory accesses. The value for N may be predetermined, may be determined according to a particular formula, may be randomly or pseudo-randomly determined, or the like. In one illustrative embodiment, N is equal to the number of threads that share the memory stream for the portion of code. Thus, if the prefetches are being distributed and shared across 4 threads, then within each instruction sequence of each thread, a prefetch is inserted at every 4th memory access instruction in the instruction sequence.

Alternatively, a non-uniform type of distribution pattern may be utilized, e.g., a pseudorandom distribution of the prefetches amongst the threads may be used, without departing from the spirit and scope of the illustrative embodiments. Moreover, the insertion of prefetch instructions into the instruction sequences of the various threads sharing the memory stream for the portion of code may be performed in a non-uniform manner rather than for every Nth memory access. Thus, the distance between a first two prefetches within the same instruction sequence may be 2 memory accesses, while a distance between a second two prefetches within the same instruction sequence may be 4 memory accesses, for example.

The shared prefetching optimization performed by the compiler 620 is implemented in optimized code 640 that is output by the compiler 620. As is generally known in the art, the optimized code 640 may be provided to a linker 650 which then converts the optimized and compiled code 640 into executable code 660. The executable code 660 may be stored in a storage device of the data processing system and/or on a removable media, such as a CD-ROM, DVD-ROM, floppy disk, or the like. This executable code 660 may then be executed on a plurality of processors 670-680 of the same data processing system that executes the compiler, or a different data processing system/computing device. As the processors execute the code 660, the performance monitoring hardware 630 may monitor the execution of the code 660 and provide feedback performance information to the compiler 620 which may use this feedback performance information to further optimize the source code 610.

It should be noted that in some cases, the compiler may make determinations that additional prefetches, e.g., redundant prefetches, may be beneficial to insert into the instruction sequences of the threads sharing the shared memory stream of the portion of code. For example, it may be beneficial to introduce some redundant prefetches when starting computations or when the number of threads sharing a shared memory stream is relatively large. Consider, for example, the example shown in FIG. 5 where there are at most 2 threads sharing the access of a given row or column of data. Assume, for example, a situation where there were 50 threads sharing the access to a data stream. Using the mechanisms of one illustrative embodiment, the prefetching of this data stream is distributed among the 50 threads, having each thread prefetching (in turn) a $50^{th}$ of the data. However, it may be unreasonable to expect all 50 threads to be executing the same accesses at nearly the same time, due to an event beyond the control of the compiler or the application code. Thus, many threads may encounter a large number of data cache misses due to the lack of sufficient prefetching. Therefore, when a data stream is shared by a number of threads above a given threshold, it may be desirable, for example, to split the pool of threads into two or more sub-pools of threads, and have each sub-pool of threads share the prefetching of the memory stream among the threads in the given sub-pool of threads.

For example, if it is experientially deemed that the threshold of threads performing common prefetching is 25, then the mechanisms of the illustrative embodiments may split the threads into two sub-pool, e.g., sub-pool A and sub-pool B, of 25 threads each. Then, the compiler may have the threads in sub-pool A each performing a $25^{th}$ of the prefetching of the whole data stream, and the threads in sub-pool B also each performing a $25^{th}$ of the prefetching of the same whole data stream. Thus, the data will end up being prefetched twice, once by a thread in sub-pool A and once by a thread in sub-pool B. Note that while the splitting of threads among sub-pools is done at compile time, there is no way for the compiler to know if the threads will be effectively split into such sub-pool at runtime. But, by performing the redundant prefetching (by a factor 2 in the above example), the likelihood that the data will be prefetched prior to being used is increased.

Figure 7:
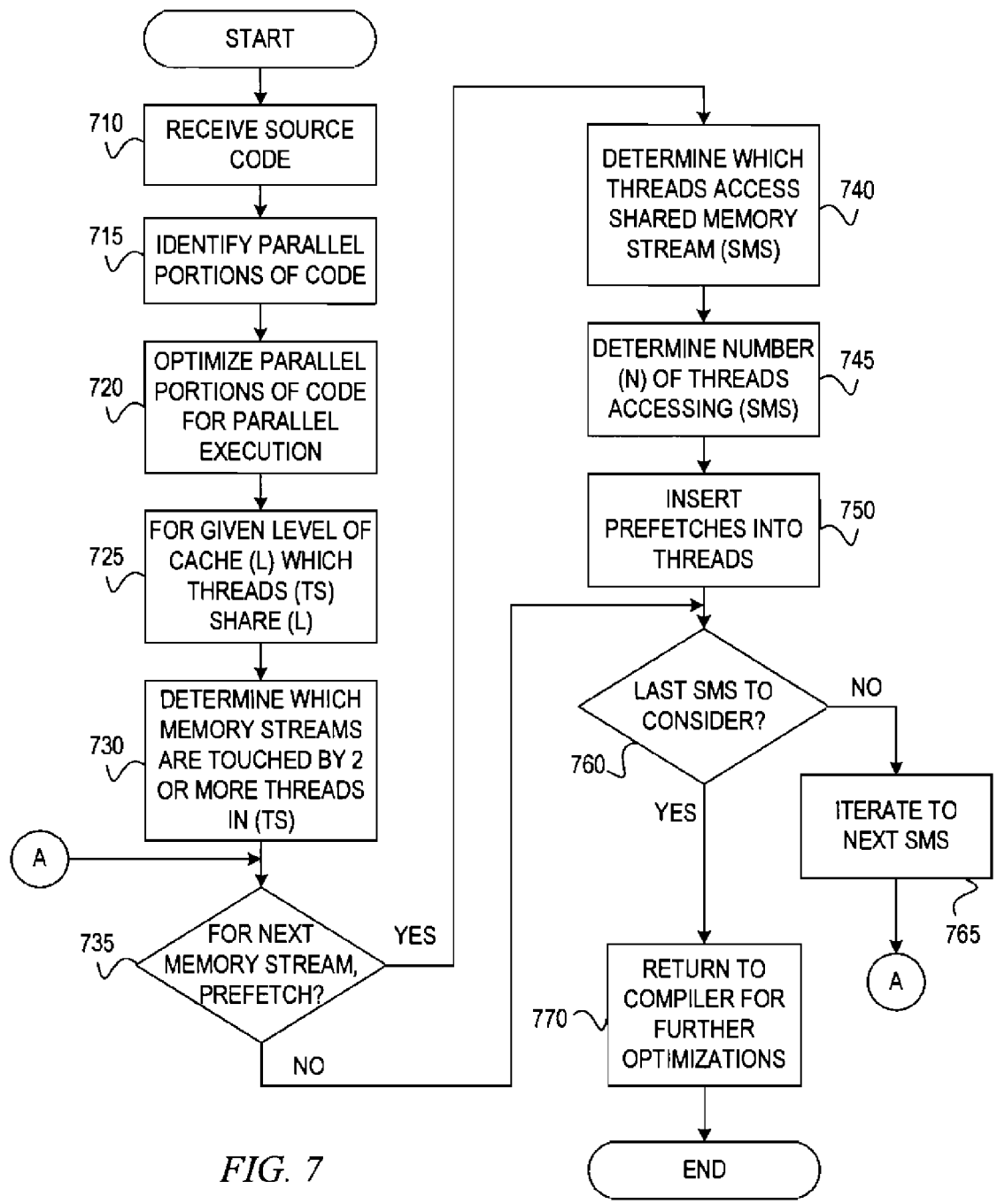
FIG. 7 is a flowchart outlining an example operation of a compiler for interleaving prefetches in accordance with one illustrative embodiment.

FIG. 7 is a flowchart outlining an example operation of a compiler for interleaving prefetches in accordance with one illustrative embodiment. The operation outlined in FIG. 7 may be performed, for example, by the compiler 620 in FIG. 6, for example.

As shown in FIG. 7, the operation starts by receiving source code to be optimized and compiled (step 710). Portions of code within the source code that may be executed in parallel are identified (step 715). Various techniques for identifying portions of code that may be performed in parallel are generally known in the art, such as loop analysis and the like, and thus, a more detailed explanation is not provided herein. Rather, this operation may take advantage of any known or later developed methodology for identifying portions of code that may be executed in parallel using multiple threads. The compiler then optimizes the code for parallel execution, thereby introducing various threads to execute the portions of code that may be executed in parallel (step 720).

The compiler determines, for a given level of cache, which threads of the threads used to execute the parallelized code, share the given level of cache (step 725). This may be accomplished with a compiler that is able to specify thread affinity, for example. In other words, the compiler knows which threads operate on a common memory stream, and the compiler has a mechanism to pass to the runtime environment, an assignment of threads (operating on common memory streams) to specific processors or cores. Consider again the example in FIG. 5 where there are 4 threads. The compiler may orchestrate the prefetching so as that the data can be prefetched in a common L1 cache by having the compiler transmit to the runtime environment that these 4 threads share a common processor or core.

For the threads sharing the given level of cache, it is determined which memory streams are touched by two or more threads, i.e. which memory streams are shared memory streams associated with parallelized portions of the code (step 730). For a next shared memory stream, the compiler determines, whether prefetching of data/instructions will be beneficial for the performance of the code for this shared memory stream (step 735). This determination may be performed using any one, or combination of, the various analyses previously mentioned above.

If it is determined that prefetching is not beneficial, a determination is made as to whether this is the last shared memory stream to be considered for shared prefetching (step 760). If so, the operation terminates by returning to the compiler to continue further analysis, optimization, and compilation (step 770). If not, the operation iterates to the next shared memory stream (step 765) and returns to step 730.

If it is determined that prefetching is beneficial for this shared memory stream, then the compiler determines which threads access the shared memory stream (step 740). The number N of these threads is calculated (step 745), and prefetches are inserted into the instruction sequence of the threads in an interleaving round-robin fashion with the prefetches being inserted at every Nth memory access within each instruction sequence of the threads (step 750). It should be appreciated that in this example, the uniform interleaving round-robin insertion approach is utilized, but in other illustrative embodiments any other uniform or non-uniform distribution of shared prefetches across the plurality of threads sharing the memory stream may be used without departing from the spirit and scope of the illustrative embodiments. The operation then continues to step 760.

Thus, the illustrative embodiments provide a mechanism by which performance improvements are obtained through prefetching while execution skew between threads sharing a shared memory stream is reduced. Moreover, the illustrative embodiments reduce overhead of prefetching by reducing the number of redundant prefetches that would otherwise be performed in a shared memory multithreaded data processing system that implements prefetching. As a result of these improvements, the code that is executed in the shared memory multithreaded data processing system will execute faster, thereby requiring relatively less processing cycles and thus, conserving system resources. Moreover, as discussed above, by having code that will execute faster through the use of the interleaving prefetches of the illustrative embodiments, the code will actually exercise the system more and will provide an improved stress test for the data processing system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing code to perform prefetching of data into a shared memory of a computing device that is shared by a plurality of threads that execute on the computing device, comprising:
   identifying, by a compiler executing on at least one processor of the data processing system, a memory stream, of a portion of code, that is shared by the plurality of threads, each thread in the plurality of threads having an associated instruction sequence;
   distributing, by the compiler, a set of prefetch instructions across the plurality of threads;
   inserting, by the compiler, prefetch instructions, of the set of prefetch instructions, into the instruction sequences of the plurality of threads such that each instruction sequence has a separate sub-portion of the set of prefetch instructions, thereby generating optimized code;
   generating executable code based on the optimized code; and
   storing the executable code in a storage device of the data processing system, wherein the executable code, when executed, performs the prefetches associated with the distributed set of prefetch instructions in a shared manner across the plurality of threads.

2. The method of claim 1, wherein inserting prefetch instructions into the instruction sequences of the plurality of threads comprises interleave prefetch instructions in the instruction sequences of the plurality of threads.

3. The method of claim 1, further comprising:
   performing, by the compiler, static analysis on the portion of code to identify where in the portion of code to insert a sub-portion of the set of prefetch instructions.

4. The method of claim 1, further comprising:
   performing, by hardware of the at least one processor, dynamic analysis of the execution of a first version of the portion of code to generate execution characteristics for the execution of the first version of the portion of code, wherein the first version of the portion of code does not include a sub-portion of the set of prefetch instructions; and
   determining, by the compiler, where in the portion of code to insert a sub-portion of the set of prefetch instructions based on the dynamic analysis.

5. The method of claim 1, wherein the set of prefetch instructions are used to prefetch at least one of data or instructions from system memory into a shared data cache local to the at least one processor.

6. The method of claim 1, wherein the inserted set of prefetch instructions cause a leading thread in the plurality of threads to slow down execution due to one or more cache misses in the memory stream and increase a speed of execution of a trailing thread due to data or instructions being prefetched into the cache prior to execution of the trailing thread requiring the data or instructions for computations or operations.

7. The method of claim 1, wherein the prefetch instruction is one of a load instruction or an instruction informing hardware prefetch mechanisms of an identity of data or one or more instructions to prefetch.

8. The method of claim 1, wherein the portion of code performs a matrix multiplication operation.

9. The method of claim 1, wherein distributing the set of prefetch instructions across the plurality of threads comprises distributing the prefetch instructions in the set of prefetch instructions uniformly using an interleaving round-robin pattern such that a prefetch instruction in the set of prefetch instructions is inserted into an instruction sequence of each thread in the plurality of threads at every Nth instruction, where N is either predetermined, determined according to a predefined formula, or is pseudo-randomly determined.

10. The method of claim 9, wherein distributing the set of prefetch instructions across the plurality of threads comprises distributing the prefetch instructions in the set of prefetch instructions in a non-uniform pattern.

11. A computer program product comprising a computer readable storage medium having a computer readable program stored therein, wherein the computer readable program, when executed on a computing device, causes the computing device to:
   identify, by a compiler executing in the computing device, a memory stream, of a portion of code, that is shared by the plurality of threads, each thread in the plurality of threads having an associated instruction sequence;
   distribute, by the compiler, a set of prefetch instructions across the plurality of threads;
   insert, by the compiler, prefetch instructions, of the set of prefetch instructions, into the instruction sequences of the plurality of threads such that each instruction sequence has a separate sub-portion of the set of prefetch instructions, thereby generating optimized code;
   generate executable code based on the optimized code; and
   store the executable code in a storage device of the data processing system, wherein the executable code, when executed, performs the prefetches associated with the distributed set of prefetch instructions in a shared manner across the plurality of threads.

12. The computer program product of claim 11, wherein the computer readable program causes the computing device to insert prefetch instructions into the instruction sequences of the plurality of threads by interleave prefetch instructions in the instruction sequences of the plurality of threads.

13. The computer program product of claim 11, wherein the computer readable program further causes the computing device to:
   perform, by the compiler, static analysis on the portion of code to identify where in the portion of code to insert a sub-portion of the set of prefetch instructions.

14. The computer program product of claim 11, wherein the computer readable program further causes the computing device to:
   perform, by hardware of the computing device, dynamic analysis of the execution of a first version of the portion of code to generate execution characteristics for the execution of the first version of the portion of code, wherein the first version of the portion of code does not include a sub-portion of the set of prefetch instructions; and
   determine, by the compiler, where in the portion of code to insert a sub-portion of the set of prefetch instructions based on the dynamic analysis.

15. The computer program product of claim 11, wherein the set of prefetch instructions are used to prefetch at least one of data or instructions from system memory into a shared data cache local to the at least one processor.

16. The computer program product of claim 11, wherein the inserted set of prefetch instructions cause a leading thread in the plurality of threads to slow down execution due to one or more cache misses in the memory stream and increase a speed of execution of a trailing thread due to data or instructions being prefetched into the cache prior to execution of the trailing thread requiring the data or instructions for computations or operations.

17. The computer program product of claim 11, wherein the prefetch instruction is one of a load instruction or an instruction informing hardware prefetch mechanisms of an identity of data or one or more instructions to prefetch.

18. The computer program product of claim 11, wherein the portion of code performs a matrix multiplication operation.

19. The computer program product of claim 11, wherein the computer readable program causes the computing device to distribute the set of prefetch instructions across the plurality of threads by distributing the prefetch instructions in the set of prefetch instructions uniformly using an interleaving round-robin pattern such that a prefetch instruction in the set of prefetch instructions is inserted into an instruction sequence of each thread in the plurality of threads at every Nth instruction, where N is either predetermined, determined according to a predefined formula, or is pseudo-randomly determined.

20. The computer program product of claim 19, wherein the computer readable program causes the computing device to distribute the set of prefetch instructions across the plurality of threads by distributing the prefetch instructions in the set of prefetch instructions in a non-uniform pattern.

21. An apparatus, comprising:
a processor; and
a memory coupled to the processor, wherein the memory comprises instructions which, when executed by the processor, cause the processor to:
identify, by a compiler executing on the processor, a memory stream, of a portion of code, that is shared by the plurality of threads, each thread in the plurality of threads having an associated instruction sequence;
distribute, by the compiler, a set of prefetch instructions across the plurality of threads;
insert, by the compiler, prefetch instructions, of the set of prefetch instructions, into the instruction sequences of the plurality of threads such that each instruction sequence has a separate sub-portion of the set of prefetch instructions, thereby generating optimized code;
generate executable code based on the optimized code; and
store the executable code in a storage device of the data processing system, wherein the executable code, when executed, performs the prefetches associated with the distributed set of prefetch instructions in a shared manner across the plurality of threads.

* * * * *